United States Patent Office 2,958,603
Patented Nov. 1, 1960

2,958,603
CORROSION INHIBITING COMPOSITION

David B. Sheldahl, Griffith, Ind., assignor to Sinclair Refining Company, New York, N.Y., a corporation of Maine No Drawing. Filed Aug. 13, 1957, Ser. No. 677,844

12 Claims. (Cl. 106—14)

My invention relates to water-dispersible slushing compositions having improved corrosion inhibiting properties. More particularly, my invention relates to slushing compositions having four components; namely, a monoethylene or diethylene glycol monoalkyl ether dispersant, sorbitan mono-oleate, ammonium mahogany sulfonate, and a mineral oil.

For slushing compounds to be of practical value, they must form a continuous coating of the corrosion inhibiting agent upon the metal surface to be protected and they must furnish a protective coating which is stable with respect to the metal-corroding environment. Thus, for example, where the environment is highly humid, the slushing compound must be stable with respect to the moist atmosphere or else the same atmosphere will quickly attack the metal surface itself.

Slushing compounds are often made by adding up to 20% of highly emulsifiable corrosion inhibitors to water. However, steel surfaces coated with such formulations often do not receive adequate protection from them when exposed to a highly humid atmosphere. The coating is often emulsified by condensing water vapors and washed away, leaving the metal bare and open to attack. This phenomenon can be readily observed in tests conducted in a humidity cabinet wherein the conditions of atmospheric humidity and their effect on slushing compound stability are simulated.

I have now found that aqueous slushing mixtures which are more aptly described as dispersals, rather than emulsions, exhibit an increased stability in the presence of atmospheric moisture. Apparently, the water and dispersant evaporate and leave a corrosion-inhibiting film on the metal surfaces to which the mixtures are applied which is not readily removed by condensing water vapors. These mixtures are described as dispersals, instead of as emulsions, because of their nature. They are not true emulsions in that, upon long standing, there is some separation. On the other hand, this separation can be eliminated and a redispersal can be effected by gentle agitation of the mixture.

I have further found that aqueous slushing dispersals producing excellent corrosion inhibiting results can be formulated from a four-component composition containing a monoethylene or diethylene glycol monoalkyl ether of the formula $H(OCH_2CH_2)_nOR$ wherein $n$ has a value of from 1 to 2 and R is an alkyl radical having 3 to 8 carbon atoms; sorbitan mono-oleate; ammonium mahogany sulfonate; and a mineral oil, preferably a mineral oil of lubricating oil viscosity. The concentrations of the components of the compositions of my invention are as follows: 5% to 15% by weight of the ether; 20% to 30% by weight of the monoester; 2% to 15% by weight of ammonium mahogany sulfonate; and substantially the remainder the mineral oil. The aqueous dispersals can contain from 0.5% to 5.0% by weight of such a composition. Thus, for example, a suitable aqueous dispersal will contain 0.5% by weight of a composition comprising 10% by weight of ethylene glycol monobutyl ether, 22.5% by weight of sorbitan mono-oleate and 6.5% by weight of ammonium mahogany sulfonate, and 61.0% by weight well refined mineral lubricating oil.

Among the monoethylene or diethylene glycol monoalkyl ethers found useful in the compositions of my invention are ethylene glycol monobutyl ether, ethylene glycol 2-ethylbutyl ether, ethylene glycol monooctyl ether, diethylene glycol monobutyl ether, and diethylene glycol monohexyl ether.

The ammonium mahogany sulfonates useful in my invention include those described in U.S. Patent 2,594,266, issued April 22, 1952, to Franklin M. Watkins. The ammonium mahogany sulfonates can be obtained by reaction of ammonia with sulfuric acid-treated hydrocarbon oils, i.e. by ammoniation of mahogany acids. Such ammonium mahogany sulfonates possess appreciable solubility in both water and hydrocarbon oils. In the practice of my invention I customarily employ the ammonium sulfonates as a concentrate in the oil from which they are derived. A typical concentrate has, for example, a sulfonate concentration of about 10% by weight. A typical concentrate can be prepared by treating a Mid-Continent neutral oil with four successive dumps of oleum, a total of 120 pounds of the oleum being used for each barrel of oil. Following removal of the separable sludge after the last dump of oleum, the acid oil is blown with air to remove sulfur dioxide and settled to remove substantially the last trace of sludge. Thereafter the oil is mixed with 0.5% by weight of water and neutralized with an excess of anhydrous ammonia. Finally the oil is heated to a temperature of 280° F. to dehydrate it, and filtered to obtain the product.

Although the ammonium mahogany sulfonates are advantageously employed in the oil solution in which they are prepared, the sulfonates can be recovered by extraction with a low molecular weight alcohol, such as isopropanol or ethanol, followed by distillation for use in the oil-free form. The distillation procedure is disclosed in U.S. Patent 2,461,371, issued February 8, 1949, to Eldon B. Cole.

Humidity cabinet tests were run on aqueous mixtures containing the water-dispersible compositions of my invention. The humidity cabinet test procedure was that of MIL–L–21260 specification (Lubricating Oil, Internal Combustion Engine, Preservative). In the humidity test, small sand blasted mild steel panels are dipped in the slushing composition and then after draining two hours at room temperature are suspended in a highly humid atmosphere, generally about 100% humidity, at 120° F. in a special cabinet and the time of initial corrosion of the panels is noted. The humidity cabinet is provided with heating units and thermal regulators for automatic temperature control. A water level of 8 inches is maintained in the bottom of the cabinet and clean air is bubbled through the water to assure high humidity at all times. The steel panels are suspended by stainless steel hooks around the periphery of the humidity cabinet. About three complete changes of air per hour are provided in the cabinet. In order to pass the test, no more than 3 rust spots one mm. in diameter should be observed on the panel after six days exposure in the cabinet.

The dispersals and emulsions described in the examples below were prepared using Lake Michigan water which contained about 175 p.p.m. total solids and about 155 p.p.m. hardness, calculated as $CaCO_3$.

Ammonium mahogany sulfonates such as are described in the examples are preferably employed in the oil solutions in which they were prepared and those mixtures of sulfonate and oil actually employed contained of the order of 10% by weight ammonium mahogany sulfonate and had the following characteristics:

| | |
|---|---|
| Gravity, API | 23.9 |
| Viscosity, SUS at 110° F. | 332 |
| Viscosity, SUS at 210° F. | 54 |
| Flash, ° F. | 170 |
| Fire, ° F. | 430 |
| Pour, ° F. | −20 |
| Color, NPA | 7 |
| Conradson carbon residue | 0.646 |
| Acid number | 13.3 |
| Saponification number | 15.2 |
| Nitrogen, percent | 0.36 |
| Sulfur, percent | 0.73 |
| ASTM, Ash, percent | 0.001 |

EXAMPLE I

*Composition A.*—A is made by stirring 6.7 grams of the ammonium mahogany sulfonate-oil mixture described above, 2.3 grams of a highly refined sorbitan mono-oleate, and 1.0 grams of ethylene glycol monobutyl ether together in a one-liter flask at room temperature until a uniform mixture is achieved.

To test the effectiveness of mixture A as a slushing composition, the flask is then filled with tap water and is shaken by hand until the composition is intimately admixed with the water. A humidity cabinet test panel is then dipped into the aqueous mixture and placed in the humidity cabinet under the conditions described above. A is found to give the test panel a humidity cabinet life of 21+ days. Upon standing, some separation is noted in that portion of the aqueous mixture remaining in the flask, indicating that the aqueous mixture is a dispersal, rather than a true emulsion. However, slight agitation of the flask by hand redisperses Composition A in the water.

The formulation of A is repeated, this time in a two-liter flask. When the uniform mixture of the ammonium mahogany sulfonate-oil mixture, sorbitan mono-oleate, and ethylene glycol monobutyl ether is achieved, the flask is filled with tap water and vigorously shaken by hand. A humidity cabinet test panel dipped in this aqueous mixture is afforded a humidity cabinet life of 21+ days, indicating that little or no protection is lost when the concentration of A in water is dropped from about 1% by weight to about 0.5% by weight. Further, upon standing some separation is noted in that a portion of the more dilute aqueous mixture remains in the flask. Again, however, a redispersal of the aqueous mixture is achieved with gentle agitation.

*Composition B.*—B is made by stirring 6.7 grams of the ammonium mahogany sulfonate-oil mixture described above, 2.3 grams of a highly refined sorbitan mono-oleate, and 1.0 grams of diethylene glycol monohexyl ether together in a one-liter flask at room temperature until a uniform mixture is achieved.

To test the effectiveness of mixture B as a slushing composition, the flask is then filled with tap water and is shaken by hand until the composition is intimately admixed with the water. A humidity cabinet test panel is then dipped into the aqueous mixture and placed in the humidity cabinet under the conditions described above. B is found to give the test panel a humidity cabinet life of 21+ days. Upon standing, some separation is noted in that portion of the aqueous mixture remaining in the flask, though not as much as with A, indicating that the aqueous mixture is a dispersal, rather than a true emulsion. However, slight agitation of the flask by hand appears to redisperse B in the water.

The formulation of B is repeated, this time in a two-liter flask. When the uniform mixture of ammonium mahogany sulfonate-oil mixture, sorbitan mono-oleate and ethylene glycol monobutyl ether is achieved, the flask is filled with tap water and vigorously shaken. A humidity cabinet test panel dipped in this aqueous mixture is afforded a humidity cabinet life of one day, indicating that considerable protection is lost when the concentration of B in water is dropped from about 1% by weight to about 0.5% by weight. Further, upon standing some separation is noted, but not to as great a degree as with A, above.

*Composition C.*—For purpose of comparison with A and B, C is made by stirring 3.0 grams of a proprietary corrosion-inhibiting product and 1.0 grams of ethylene glycol monobutyl ether together in a one-liter flask at room temperature until the mixture is uniform. The flask is then filled with tap water and vigorously shaken by hand. A humidity cabinet test panel dipped in this aqueous mixture is afforded a humidity cabinet life of 1− days.

When the concentration of C in water is increased by two and one-half times, the humidity cabinet life of a panel dipped therein is only 2 days. Only when such concentration is increased by about five times is such a humidity cabinet life extended to 21 days. Thus in approximately a liter of water it takes about ten times the weight of A to accomplish the same results with C and it takes at least five times the weight of B to accomplish the same results with C. At the same time, C is observed to have a greater stability in water, so that it can properly be said to form an emulsion, as opposed to the dispersals formed with A and B.

*Composition D.*—Again for comparative purposes, a "perfect" emulsion is produced by emulsifying D, which contains three of the four components of A or B, namely, the ammonium mahogany sulfonate, the oil and the sorbitan mono-oleate. In place of the ethylene or diethylene glycol monoalkyl ether dispersant in which the monoalkyl radical contains 3 to 8 carbon atoms, however, D contains an emulsifying agent. Thus, in making D, 12.4 grams of the ammonium mahogany sulfonate-oil mixture are stirred together with 4.2 grams of the sorbitan mono-oleate, 14.6 grams rosin, 5.9 grams ethylene glycol monoethyl ether, 9.4 grams oleic acid, and 2.1 grams flake caustic in a one-liter flask at room temperature until a uniform mixture is produced. It will be seen that the relative proportions of the sulfonate, the oil and the mono-oleate contained in D are the same as in A and B.

The flask containing D is then filled with tap water and vigorously shaken by hand. A humidity cabinet test panel dipped in this aqueous mixture is afforded a humidity cabinet life of 1− days. Thus, despite the increased concentration of the sulfonate, the oil and the mono-oleate in the emulsion of Composition D, as compared to the dispersals of concentrated A and B, the protection available is considerably less.

EXAMPLE II

*Composition E* is made by stirring 6.7 grams of the ammonium mahogany sulfonate-oil mixture described above, 2.3 grams of the highly refined sorbitan mono-oleate, and 1.0 grams ethylene glycol monobutyl ether together in a one-liter flask at room temperature until a uniform mixture is achieved. The flask is then filled with tap water and shaken vigorously. A humidity cabinet test panel dipped in this aqueous dispersal has a 21+ day humidity cabinet life.

*Composition F* is made by stirring 3.3 grams of the ammonium mahogany sulfonate-oil mixture, 1.2 grams of the sorbitan mono-oleate, and 0.5 grams ethylene glycol monobutyl ether together in a one-liter flask at room temperature until a uniform mixture is achieved. The flask is then filled with tap water and shaken vigorously. A humidity cabinet test panel dipped in this aqueous dispersal has a 21+ day humidity cabinet life.

*Composition G* is made by stirring 6.9 grams of the ammonium mahogany sulfonate-oil mixture, 2.3 grams of the sorbitan mono-oleate, and 0.8 grams ethylene glycol monobutyl ether together in a one-liter flask at room temperature until a uniform mixture is achieved. The flask is then filled with tap water and shaken vigorously. A humidity cabinet test panel dipped in this aqueous dispersal has a 21+ day humidity cabinet life.

Composition H is made by stirring 6.7 grams of the ammonium mahogany sulfonate-oil mixture, 2.3 grams sorbitan mono-oleate, and 1.0 grams ethylene glycol 2-ethylbutyl ether together in a one-liter flask at room temperature until a uniform mixture is achieved. The flask is then filled with tap water and shaken vigorously. A humidity cabinet test panel dipped in this aqueous dispersal has a 21+ day humidity cabinet life.

Composition I is made by stirring 6.7 grams ammonium mahogany sulfonate-oil mixture, 2.3 grams sorbitan mono-oleate, and 1.0 grams diethylene glycol monobutyl ether together in a one-liter flask at room temperature until a uniform mixture is achieved. The flask is then filled with tap water and shaken vigorously. A humidity cabinet test panel dipped in this aqueous dispersal has an 11 day humidity cabinet life.

Composition J is made by stirring 6.7 grams ammonium mahogany sulfonate-oil mixture, 2.3 grams sorbitan mono-oleate, and 1.0 grams diethylene glycol monohexyl ether together in a one-liter flask at room temperature until a uniform mixture is achieved. The flask is then filled with tap water and shaken vigorously. A humidity cabinet test panel dipped in this aqueous dispersal has a 21+ day humidity cabinet life.

Composition K is made by stirring 3.3 grams ammonium mahogany sulfonate-oil mixture, 1.2 grams sorbitan mono-oleate, and 0.5 gram diethylene glycol monohexyl ether together in a one-liter flask at room temperature until a uniform mixture is achieved. The flask is then filled with tap water and shaken vigorously. A humidity cabinet test panel dipped in this aqueous dispersal has a one day humidity cabinet life.

Composition L is made by stirring 6.9 grams ammonium mahogany sulfonate-oil mixture, 2.3 grams sorbitan mono-oleate, and 0.8 gram diethylene glycol monohexyl ether together in a one-liter flask at room temperature until a uniform mixture is achieved. The flask is then filled with tap water and shaken vigorously. A humidity cabinet test panel dipped in this aqueous dispersal has a 21+ day humidity cabinet life.

The dispersant properties of the various ethylene or diethylene glycol monoalkyl ethers employed vary. These are measured, on the one hand, by the results produced in the humidity cabinet tests as noted above, and, on the other hand, by observation of the ability of the dispersed composition to resist the formation of separated globules of its components which will not redisperse readily upon agitation. In other words, to be highly rated, the dispersant ether component must neither produce a "perfect" emulsion having a complete stability as regards separation nor produce an aqueous mixture which is highly unstable as regards separation. Accordingly, the dispersant properties of the ethylene or diethylene glycol ethers are rated as follows:

| Ether | Dispersant Properties |
| --- | --- |
| Ethylene glycol monobutyl ether | Excellent. |
| Diethylene glycol monohexyl ether | Do. |
| Ethylene glycol 2-ethylbutyl ether | Good. |
| Diethylene glycol monobutyl ether | Fair. |
| Diethylene glycol monomethyl ether | Poor. |
| Ethylene glycol monoethyl ether | Very poor. |

Further, those dispersant ethers of normally excellent and good dispersal qualities, if used in smaller proportions with the other components of my compositions, do not display those qualities to best advantage; the dispersals formed tend to separate more quickly. Again, when my compositions are used at very low concentrations in water, globules of oil and the other components thereof separate out. Thus, when dispersals are made with less than about 0.5% by weight of one of my compositions, curd-like materials may separate which interfere with the deposition of continuous protective film on the metal sought to be protected. However, an increase of the concentration of the composition in water together with slight agitation readily redisperses the curd-like materials.

I claim:

1. A water-dispersible slushing composition consisting essentially of from 5% to 15% by weight of a compound having the formula $$H(OCH_2CH_2)_nOR$$

wherein $n$ is an integer from 1 to 2 and R is a monoalkyl radical having 3 to 8 carbon atoms, from 20% to 30% by weight of sorbitan mono-oleate, from 2% to 15% ammonium mahogany sulfonate, and substantially the remainder being a mineral oil.

2. A composition according to claim 1 in which the compound of the formula is ethylene glycol monobutyl ether.

3. A composition according to claim 1 in which the compound of the formula is diethylene glycol monohexyl ether.

4. A composition according to claim 1 in which the compound of the formula is ethylene glycol 2-ethylbutyl ether.

5. A composition according to claim 1 in which the mineral oil is the oil from which the ammonium mahogany sulfonate is derived.

6. A composition according to claim 1 in which the compound of the formula is ethylene glycol monobutyl ether and the mineral oil is the oil from which the ammonium mahogany sulfonate is derived.

7. A composition according to claim 1 in which the compound of the formula is diethylene glycol monohexyl ether and the mineral oil is the oil from which the ammonium mahogany sulfonate is derived.

8. A composition according to claim 1 in which the compound of the formula is ethylene glycol 2-ethylbutyl ether and the mineral oil is the oil from which the ammonium mahogany sulfonate is derived.

9. A composition consisting essentially of water and from 0.5% to 5% by weight of a composition according to claim 1.

10. A composition consisting essentially of water and from 0.5% to 5% by weight of a composition according to claim 6.

11. A composition consisting essentially of water and from 0.5% to 5% by weight of a composition according to claim 7.

12. A composition consisting essentially of water and from 0.5% to 5% by weight of a composition according to claim 8.

References Cited in the file of this patent

UNITED STATES PATENTS

| | | |
| --- | --- | --- |
| 2,069,626 | Roehner | Feb. 2, 1937 |
| 2,408,971 | Duncan | Oct. 8, 1946 |
| 2,517,636 | David | Aug. 8, 1950 |
| 2,595,158 | McCue et al. | Apr. 29, 1952 |
| 2,598,949 | Walker et al. | June 3, 1952 |
| 2,716,611 | Paxton | Aug. 30, 1955 |

OTHER REFERENCES

Surface Active Agents, Interscience Publishers, Inc., N.Y., 1949 (page 209).